(12) United States Patent
Maekawa

(10) Patent No.: US 11,034,587 B2
(45) Date of Patent: Jun. 15, 2021

(54) METHOD OF PRODUCING ZEOLITE FILM

(71) Applicant: MITSUI E&S MACHINERY CO., LTD., Tokyo (JP)

(72) Inventor: Kazuya Maekawa, Tokyo (JP)

(73) Assignee: MITSUI E&S MACHINERY CO., LTD., Tokyo (JP)

(*) Notice: Subject to any disclaimer, the term of this patent is extended or adjusted under 35 U.S.C. 154(b) by 0 days.

(21) Appl. No.: 16/762,826

(22) PCT Filed: Jul. 29, 2019

(86) PCT No.: PCT/JP2019/029592
§ 371 (c)(1),
(2) Date: May 8, 2020

(87) PCT Pub. No.: WO2020/225932
PCT Pub. Date: Nov. 12, 2020

(65) Prior Publication Data
US 2020/0392007 A1    Dec. 17, 2020

(51) Int. Cl.
*C01B 39/00* (2006.01)
*C01B 39/02* (2006.01)
(Continued)

(52) U.S. Cl.
CPC ......... *C01B 39/023* (2013.01); *B01J 19/0013* (2013.01); *B01J 19/305* (2013.01);
(Continued)

(58) Field of Classification Search
CPC ....... C01B 39/00; C01B 39/02; C01B 39/023; B01J 19/00; B01J 19/0006; B01J 19/0013;
(Continued)

(56) References Cited

U.S. PATENT DOCUMENTS

| 7,923,522 B2 * | 4/2011 | Hamada ................ C23C 18/122 528/21 |
| 2001/0048971 A1 * | 12/2001 | Komarneni ............. C04B 38/04 427/226 |
| 2004/0033180 A1 | 2/2004 | Matsukata et al. |

FOREIGN PATENT DOCUMENTS

| JP | 2004099338 A | 4/2004 |
| JP | 2008285365 A | 11/2008 |

(Continued)

*Primary Examiner* — Natasha E Young
(74) *Attorney, Agent, or Firm* — Juan Carlos A. Marquez; Marquez IP Law Office, PLLC

(57) ABSTRACT

Provided is a method of producing a zeolite film continuously and efficiently.

Zeolite is formed on a surface of a support using a method including: a first step of attaching zeolite fine crystals to a surface of a support; a second step of preparing synthetic gel for growing the fine crystals; a third step of putting the support and the synthetic gel into a reactor and performing hydrothermal synthesis; and a fourth step of cleaning the support subjected to the hydrothermal synthesis, in which in the third step, multiple containers arranged to be movable in a constant-temperature apparatus are each used as the reactor, the temperature and pressure for the hydrothermal synthesis is adjusted by the temperature and pressure in the constant-temperature apparatus, and the reaction time of the hydrothermal synthesis is adjusted by setting the time from when the reactor enters the constant-temperature apparatus to when the reactor exits the constant-temperature apparatus.

4 Claims, 2 Drawing Sheets

(51) Int. Cl.
*B01J 19/00* (2006.01)
*B01J 19/30* (2006.01)
(52) U.S. Cl.
CPC ............... *B01J 2219/00051* (2013.01); *B01J 2219/00162* (2013.01)
(58) Field of Classification Search
CPC ...... B01J 19/30; B01J 19/305; B01J 2219/00; B01J 2219/00049; B01J 2219/00051; B01J 2219/00162
See application file for complete search history.

(56) References Cited

FOREIGN PATENT DOCUMENTS

| | | | |
|---|---|---|---|
| JP | 2010017606 A | 1/2010 | |
| JP | 2010058015 A | 3/2010 | |
| JP | 2010131600 A | 6/2010 | |
| JP | 2018167267 A | 11/2018 | |

\* cited by examiner

METHOD OF PRODUCING ZEOLITE FILM

This application is a national stage application claiming priority to PCT/JP2019/029592, now WO 2020/225932, filed on Jul. 29, 2019, which claims priority to Japanese Patent Application Serial No. JP2019-089194, filed on May 9, 2019.

TECHNICAL FIELD

The present invention relates to methods of continuously producing zeolite films industrially.

BACKGROUND ART

The use of zeolite films for processes for separating and concentrating liquid mixture or gaseous mixture has been increased in commercial plants in recent years. In general, a zeolite film for separation and concentration is synthesized on a surface of a porous support, and it is used integrally with the support. Such zeolite films have been produced in a batch production method also industrially in which seed crystals are applied to a surface of a support, and the support is immersed in aqueous gel and subjected to hydrothermal synthesis (see, for example, patent document 1). Thus, the production method has a problem that the process of producing zeolite films requires manpower, leading to a high production cost. A method of continuously producing zeolite films in automatic operation has not been established yet.

To industrially produce zeolite films the demand for which is increasing more and more toward the future, a method is desired that is capable of stably producing high-quality zeolite films efficiently without using manpower.

PRIOR ART DOCUMENT

Patent Document

Patent Document 1: Japanese patent application Kokai publication No. 2010-131600

SUMMARY OF THE INVENTION

Problem to be Solved by the Invention

An object of the present invention is to provide a method of continuously producing zeolite films efficiently.

Means for Solving the Problem

A method of producing a zeolite film according to the present invention to achieve the above object is a method of producing a zeolite film by forming zeolite on a surface of a support, characterized in that the method comprises the following first to fourth steps:

a first step of attaching zeolite fine crystals to a surface of a support;

a second step of preparing synthetic gel for growing the fine crystals;

a third step of putting the support and the synthetic gel into reactors and performing hydrothermal synthesis; and a fourth step of cleaning the support subjected to the hydrothermal synthesis, and in the third step, multiple containers arranged to be movable in a constant-temperature apparatus are each used as the reactors, the temperature and pressure for the hydrothermal synthesis is adjusted by the temperature and pressure in the constant-temperature apparatus, and the reaction time of the hydrothermal synthesis is adjusted by setting the time from when the reactors enter the constant-temperature apparatus to when the reactors exit the constant-temperature apparatus.

Effects of the Invention

The method of producing zeolite films according to the present invention makes it possible to produce zeolite films continuously and efficiently because zeolite is formed in a film shape on a surface of a support in reactors arranged to be movable in a constant-temperature apparatus.

In the second step, it is possible to use at least two pieces of preparation equipment to prepare the synthetic gel continuously.

In the fourth step, it is possible to sequentially take out the support having a zeolite film from the reactor moved out of the constant-temperature apparatus, and to clean the support continuously.

MODES FOR CARRYING OUT THE INVENTION

A zeolite film produced by the present invention is a zeolite film composed of zeolite crystals formed on the surface of a porous support. Examples of types of zeolite crystals include, for example, zeolite A, zeolite Y, zeolite NaA, zeolite T, zeolite ZSM-5, mordenite, zeolite CHA, zeolite X, and sodalite.

The porous support is not limited to any specific ones as long as the surface of the porous support has a stable porous structure on which zeolite can be crystallized in the form of a film. Preferable examples of porous supports include ceramic sintered materials composed of silica, alumina, mullite, zirconia, silicon nitride, silicon carbide, or the like; sintered metal composed of iron, stainless steel, or the like; glass; carbon molding materials, and the like. More preferable examples of porous supports include ceramic sintered materials composed of silica, alumina, mullite, and the like. The shapes of porous supports are not limited to any specific ones. Shapes such as a flat film shape, a flat plate shape, a cylindrical shape (pipe), and a columnar shape can be selected according to the purpose of use.

In the support used in the production method of the present invention, the average pore diameter is preferably 0.05 to 10 μm, and more preferably 0.1 to 4 μm. If the average pore diameter is less than 0.05 μm, the permeation rate is low, and if it is more than 10 μm, the selectivity is low, which is not preferable. In addition, in the support used in the production method of the present invention, the porosity is preferably 10 to 80%, and more preferably 40 to 80%. If the porosity is less than 10%, the permeation rate is low, and if it is more than 80%, the water-selective permeability is low, and the strength is not enough for the support, which is not preferable. Preferable porous supports are ceramic sintered materials composed of silica, alumina, mullite, or the like having a porous structure with an average pore diameter of 0.1 to 2 μm and a porosity of 30 to 50%.

Figure 1:
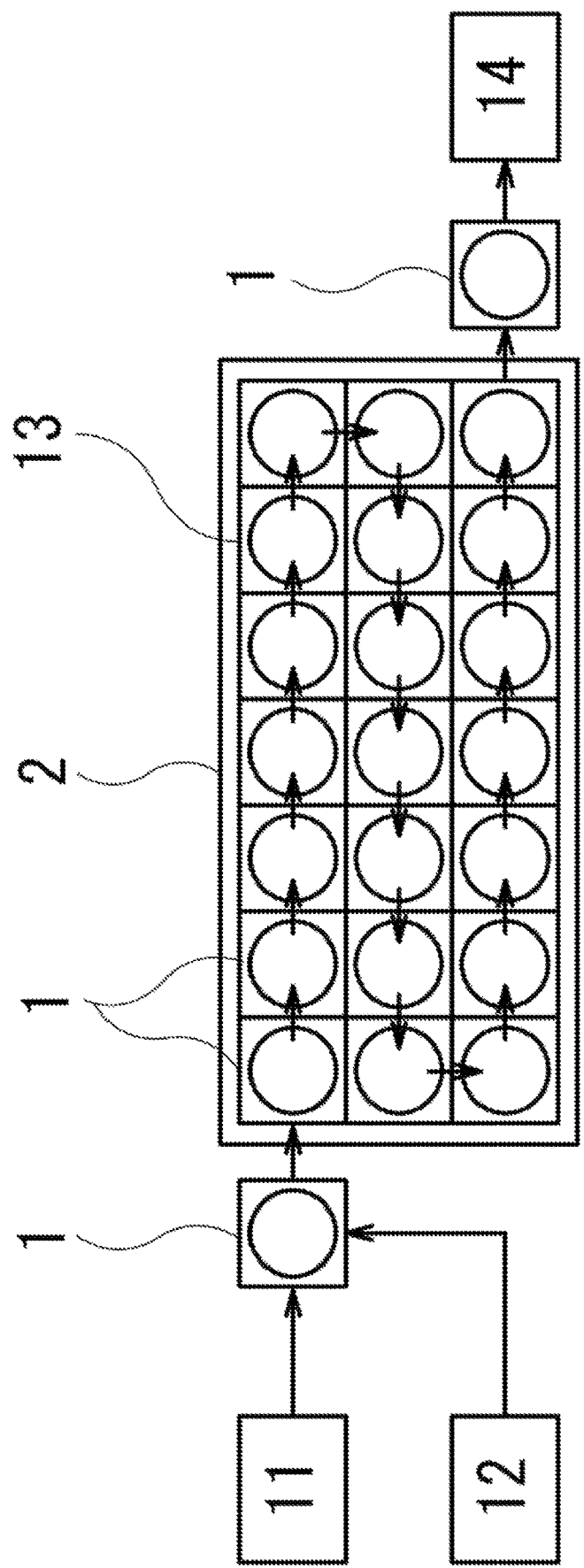
FIG. 1 is a schematic explanatory diagram illustrating an example of an embodiment of a production method according to the present invention.
Figure 2:
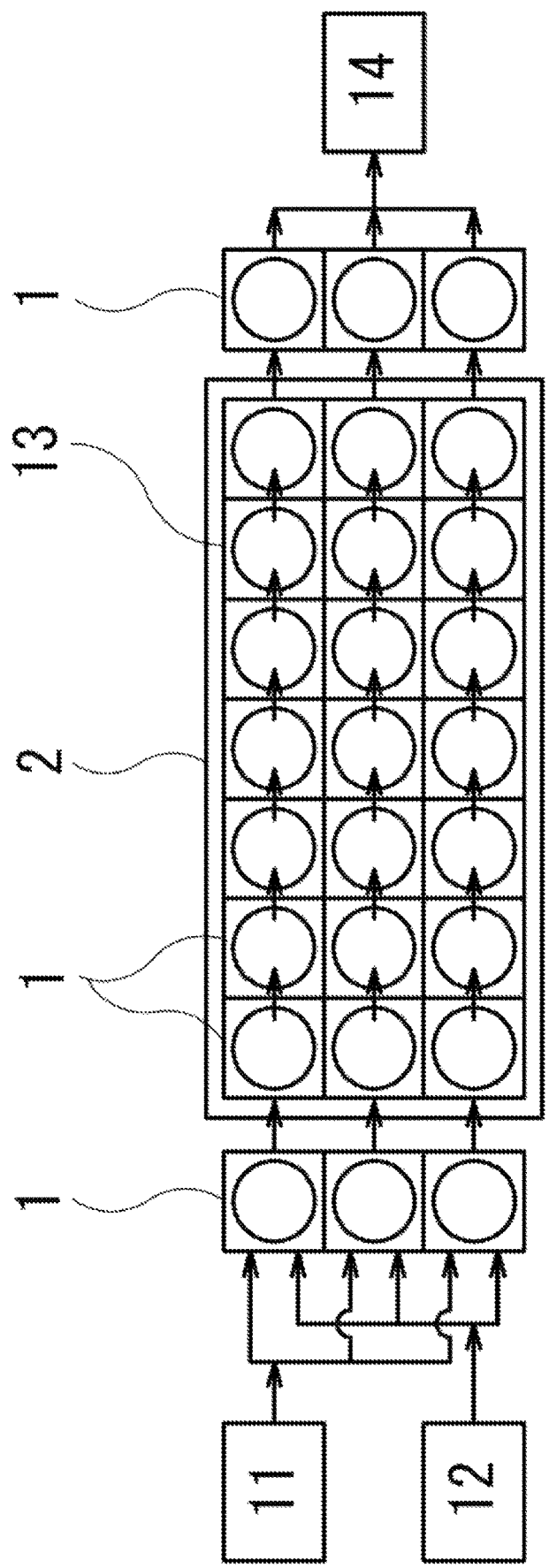
FIG. 2 is a schematic explanatory diagram illustrating another example of an embodiment of a production method according to the present invention.

The method of producing zeolite films according to the present invention includes the following first to fourth steps:
First step: a step of attaching zeolite fine crystals to the surface of a support
Second step: a step of preparing synthetic gel for growing the fine crystals
Third step: a step of putting the support and the synthetic gel into reactors and performing hydrothermal synthesis
Fourth step: a step of cleaning the support subjected to the hydrothermal synthesis FIGS. 1 and 2 are diagrams schematically illustrating examples of embodiments of the method of producing zeolite films. In FIGS. 1 and 2, a support (not illustrated) is provided to the first step 11, and zeolite fine crystals are attached to the surface of the support. The support is then provided into a reactor 1 in the third step 13. In the second step 12, synthetic gel is prepared and provided into the reactors 1 in the third step 13. In the third step 13, the support and the synthetic gel are put into the reactors 1, in which hydrothermal synthesis is performed while the reactors 1 are moving in a constant-temperature apparatus 2. The reactors 1 moved out of the constant-temperature apparatus 2 are provided to the fourth step 14, in which the support subjected to the hydrothermal synthesis is cleaned.

The first step is a step of applying and attaching zeolite fine crystals to the surface of the foregoing porous support on which a zeolite film is to be formed. The zeolite fine crystals are of the same kind as that of a zeolite to be produced, those having a similar crystal framework to that of a zeolite to be produced, or those that can serve as parts for the crystal framework of a zeolite to be produced. The method of attaching zeolite fine crystals is not limited to any specific ones. For example, zeolite fine crystals dispersed in a suitable solvent can be applied to the support. Alternatively, zeolite fine crystals may be attached to the support by dispersing zeolite fine crystals in a suitable solvent and immersing the support into the solvent and then pulling it up, which is generally called dip coating. Drying the support after the application increases the adhesion of the fine crystals to the support.

The second step is a step of preparing synthetic gel for growing zeolite crystals. The synthetic gel for zeolite contains components selected from an alumina source, a silica source, fluorine compounds, and water, and it may also contain a structure directing agent as necessary. As the preparation composition of the synthetic gel, the Si/Al mol ratio, F/Al mol ratio, $H_2O$/Si mol ratio, and the like may be appropriately determined depending on the type of zeolite. The structure directing agent can be added as necessary.

Note that the second step may further include aging of the prepared synthetic gel. The aging temperature is preferably the room temperature to 50° C., and more preferably 15 to 40° C. The aging time is preferably 0.5 to 24 hours, and more preferably 1 to 2 hours. The aging temperature and the aging time may be determined appropriately depending on the type of zeolite.

The synthetic gel is prepared continuously in an amount necessary in the subsequent third step by preparation equipment. The preparation equipment may be large equipment that produces a necessary amount of synthetic gel or may be multiple small pieces of equipment that produce synthetic gel continuously. The second step may be performed in parallel with the first step. The first step and the second step may be performed automatically using robots or the like without using manpower.

The third step is a step of putting the support and the synthetic gel into the reactors and performing hydrothermal synthesis. The support with zeolite fine crystals attached on its surface in the first step is held in the reactors. The synthetic gel prepared in the second step is provided into the reactors, and the support is immersed in the synthetic gel. In the third step, multiple containers arranged to be movable in the constant-temperature apparatus are used as reactors, in which hydrothermal synthesis is performed while the reactors are moving in the constant-temperature apparatus. The temperature and pressure for the hydrothermal synthesis are adjusted by the temperature and pressure in the constant-temperature apparatus, and the reaction time is the time from when reactors enter the constant-temperature apparatus to when they exit the apparatus. The reaction time can be adjusted by changing the length of the route in which the reactors move in the constant-temperature apparatus and the speed of the reactors.

The type of reactors is not limited to any specific ones as long as hydrothermal synthesis for zeolite can be performed in it. Reactors used for a batch production method for zeolite may be used, or the equipment of the reactor may be simplified and used. The reactors may have, for example, means for holding the support in the reactors, means for stirring, means for adjusting temperature, means for adjusting pressure, and the like.

Means form moving the reactors in the constant-temperature apparatus is not limited to specific means. For example, the reactors may be moved by placing them on a belt conveyor or a roller conveyor. The movement of the reactors may be continuous or intermittent. In other words, the reactors may be always moved in the constant-temperature apparatus, or moving and stopping may be repeated.

The route in which the reactors move in the constant-temperature apparatus is not limited to any specific ones. For example, as illustrated in FIG. 1, the reactors 1 may be arranged in series and moved in a route combining straight movements and turnings, such as, going straight from the entrance of the constant-temperature apparatus, then turning right twice, going straight, turning left twice, and going straight to the exit. Alternatively, as illustrated in FIG. 2, multiple reactors 1 may be lined in a direction perpendicular to the moving direction in the constant-temperature apparatus, and the lined reactors 1 may be arranged in series in the moving direction and moved straight from the entrance to the constant-temperature apparatus toward the exit. Note that the route for moving in the constant-temperature apparatus is not limited to the above examples.

While the reactors are moving in the constant-temperature apparatus, hydrothermal synthesis is performed, and zeolite crystals are formed in the form of a thin film on the surface of the support. After a specified dwell time has passed, the reactors exit the constant-temperature apparatus and is provided to the fourth step. In the fourth step, the support subjected to hydrothermal synthesis is taken out of the reactors and cleaned. The method of taking out the support from the reactors and the method of cleaning the support may be ordinary ones. The fourth step may be performed automatically using robots or the like without using manpower.

The method of producing zeolite films according to the present invention makes it possible to produce zeolite films continuously and efficiently because the thin zeolite film is formed on the surface of the support in the reactors arranged to be movable in the constant-temperature apparatus.

EXPLANATION OF REFERENCE NUMERALS 1 reactors
2 constant-temperature apparatus 11 first step
12 second step
13 third step
14 fourth step

The invention claimed is:

1. A method of producing a zeolite film by forming zeolite on a surface of a support, characterized in that the method comprises the following first to fourth steps:
a first step of attaching zeolite fine crystals to a surface of a support;
a second step of preparing synthetic gel for growing the fine crystals;
a third step of putting the support and the synthetic gel into reactors and performing hydrothermal synthesis; and
a fourth step of cleaning the support subjected to the hydrothermal synthesis, wherein
in the third step, multiple containers arranged to be movable in a constant-temperature apparatus are each used as the reactors, the temperature and pressure for the hydrothermal synthesis is adjusted by the temperature and pressure in the constant-temperature apparatus, and the reaction time of the hydrothermal synthesis is adjusted by setting the time from when the reactors enter the constant-temperature apparatus to when the reactors exit the constant-temperature apparatus.

2. The method of producing a zeolite film according to claim 1, characterized in that in the second step, at least two pieces of preparation equipment are used to prepare the synthetic gel continuously.

3. The method of producing a zeolite film according to claim 1, characterized in that in the fourth step, the support having a zeolite film is sequentially taken out of the reactors moved out of the constant-temperature apparatus, and cleaned continuously.

4. The method of producing a zeolite film according to claim 2, characterized in that, in the fourth step, the support having a zeolite film is sequentially taken out of the reactors moved out of the constant-temperature apparatus, and cleaned continuously.

* * * * *